United States Patent [19]

Simpson

[11] Patent Number: 4,918,855

[45] Date of Patent: Apr. 24, 1990

[54] TRAP FOR CATCHING ANIMALS

[76] Inventor: Davis W. Simpson, 2819 Whisper Path, San Antonio, Tex. 78230

[21] Appl. No.: 40,082

[22] Filed: Apr. 20, 1987

[51] Int. Cl.$^5$ ............................................. A01M 23/24
[52] U.S. Cl. ............................................. 43/85; 43/77
[58] Field of Search ................... 43/85, 81, 82, 77, 94, 43/83, 91

[56] References Cited

U.S. PATENT DOCUMENTS

| | | |
|---|---|---|
| 253,907 | 2/1882 | Andre . |
| 624,665 | 5/1899 | Lewis . |
| 829,688 | 8/1906 | Bean ........................................ 43/91 |
| 1,052,320 | 2/1913 | Crain . |
| 1,216,918 | 2/1917 | Armbruster . |
| 1,273,185 | 7/1918 | Reich . |
| 1,844,739 | 2/1932 | Austin . |
| 2,222,653 | 11/1940 | Chambless ............................. 43/85 |
| 2,869,280 | 1/1959 | Dobratz ................................. 43/77 |
| 3,177,608 | 4/1965 | Lindelow . |
| 3,828,460 | 8/1974 | Herman . |
| 4,070,787 | 1/1978 | Oakes ..................................... 43/94 |
| 4,403,438 | 9/1983 | West-Harron ......................... 43/82 |
| 4,471,560 | 9/1984 | Hughan .................................. 43/85 |
| 4,638,590 | 1/1987 | Desrosiers et al. . |
| 4,662,102 | 5/1987 | Marcolina ............................. 43/85 |

Primary Examiner—Kurt Rowan
Attorney, Agent, or Firm—Cox & Smith Inc.

[57] ABSTRACT

A trap comprising first and second arms, a bait for holding the first and second arms in a first open position, torsion springs for biasing the first and second arms toward a second closed position, and jaws formed in the first and second arms for engaging the body of an animal when the bait is broken. A method for constructing the trap is provided, and a method for trapping animals is also provided.

11 Claims, 1 Drawing Sheet

TRAP FOR CATCHING ANIMALS

BACKGROUND OF THE INVENTION

The present invention relates to a trap for catching animals. More specifically, the present invention relates to a trap for capturing small animals such as mice, rats, voles, shrews, or moles in a head or body hold.

Traditionally traps for catching small animals are either arresting traps or killing traps. The classic mouse trap comprises a spring-activated bow arm on a wooden base. A bait is secured to the base so that when the bait is taken, a locking bar is triggered and the bow arm pivots rapidly to engage the mouse between the bow arm and the base. This type of trap suffers from the disadvantage that it may or may not kill the trapped animal, depending upon the orientation of the animal to the base at the time the bow arm is triggered. The traditional trap is also deficient in that it may cause considerable pain and suffering to the trapped animal if it fails to kill the animal. The traditional mouse trap may be dangerous to children and pets, since the bait is in plain view and accessible.

A further disadvantage of the traditional mouse trap is that because the bow arm must pivot through almost 180 degrees before capturing the animal, a quick and alert mouse has enough time to escape before the trap closes. Most commercially available traps suffer from the disadvantage that such traps must be baited and set by the user, and the baiting and setting of a trap can injure the user if he is not extremely careful.

It is an object of the present invention to provide a trap for catching animals which securely engages the animal when the trigger is released.

Another object of the present invention is to provide a humane animal trap which causes certain and swift death to the trapped animal by either breaking the neck of the trapped animal or asphyxiating the trapped animal.

A further object of the present invention is to provide a humane animal trap which is inexpensive to produce, efficient in its action, which requires no baiting or setting, and which can be discarded together with the body of the trapped animal.

Yet another object of the present invention is to provide a trap for small animals which is safe when used in areas where children or pets are likely to be.

There and other objects, features and advantages of the present invention will become evident in light of the following detailed description.

SUMMARY OF THE INVENTION

These objects and advantages are accomplished by providing an animal trap comprising first and second arms, edible means for holding said first and second arms in a first open position, means for biasing said first and second arms toward a second closed position, and means formed in each of said first and second arms for engaging a portion of the body of an animal after the animal breaks the edible means, thereby allowing the first and second arms to spring towards the second closed position to engage the body of the animal. A method for constructing an animal trap is also provided, comprising the steps of bending a high tension wire in twelve places at spaced intervals to form an animal trap, setting the trap in a first open position, sliding an edible bait onto the set trap, the edible bait holding the trap in the first open position and extending between the base and torsion springs of the trap and the trigger arm of the trap, and inserting the set and baited animal trap into a funnel-shaped sleeve. A method for trapping animals with the apparatus of the present invention is provided, comprising the steps of placing a trap having opposable jaws held biased in an open position by an edible bait in a location accessible to animals; permitting an animal to break the bait thus releasing the trap jaws to engage a portion of the animal's body; and discarding both the trap and the entrapped animal.

DETAILED DESCRIPTION OF THE PREFERRED EMBODIMENT

Figure 1:
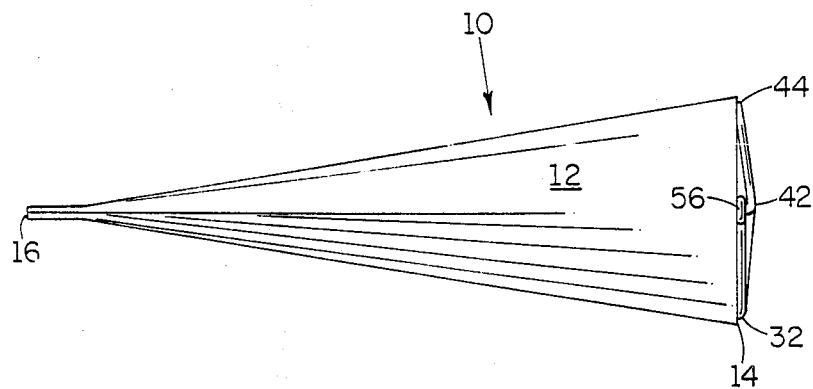
FIG. 1 is a side view of an apparatus constructed according to the teachings of the present invention.

The trap for catching animals of the present invention is indicated generally at reference numeral 10. Trap 10 is received within a sleeve 12 which is provided with an open end 14 and a closed end 16. In a presently preferred embodiment the sleeve 12 is constructed of a relatively stiff and preferably dark colored cardboard, but it can also be constructed of plastic or fabric, as is known in the art. The sleeve 12 can be extended forward so as to completely enclose and hide from view the body of an animal entrapped therein (not shown).

The function of sleeve 12 is that sleeve 12 causes the mouse or other small animal to approach a bait 18 through and within the base jaw 20 and spring jaw 22 of trap 10. In a presently preferred embodiment, the bait 18 functions as a trigger to release the trap. Bait 18 is preferably a dried, formed pasta or other bait such as an edible plastic or hard candy.

Generally mice and other rodents prefer to eat hard, protein-rich foods. The Applicant believes that one of the foods mice especially like to eat is dry pasta. Dry pasta satisfies a mouse's need to chew on hard foods. If the pasta is made with nutritious or aromatic oils or other flavorings and high protein grain flours such as the commonly used semolina or triticale wheat, the pasta appears to be a preferred mouse food. In the Applicant's experience a mouse will choose to eat pasta rather than other available foods. In tests conducted by the Applicant, the pasta bait trigger 18 of the present invention easily attracts mice although other appropriate baits can be used. The Applicant has also observed that mice are extremely inquisitive. Mice tend to investigate dark enclosures containing food. Thus, the dark colored funnel-like sleeve 12 containing the trap 10 and jaws 20 and 22 of the present invention provides an excellent opportunity for a mouse to both investigate and feed.

Figure 3:
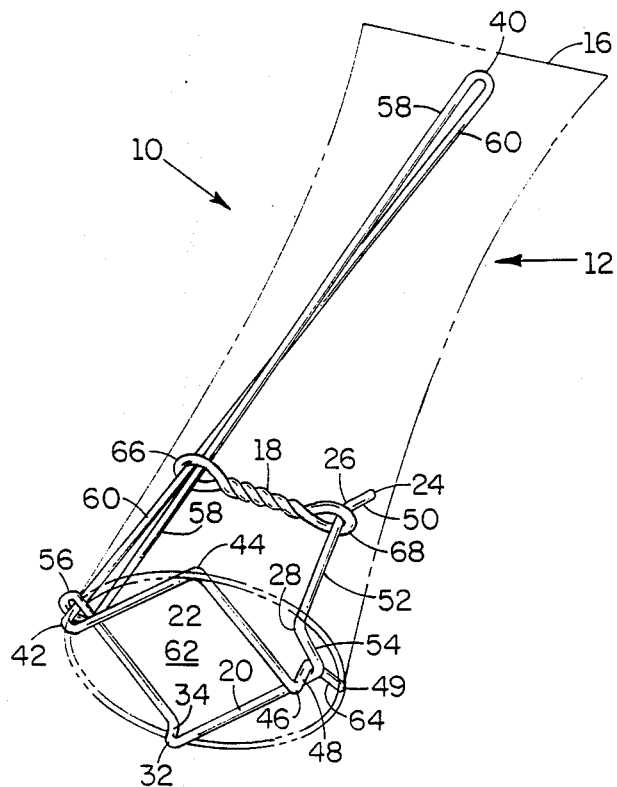
FIG. 3 is a perspective view of an apparatus constructed according to the teachings of the present invention.

Referring to FIG. 3, the bent and twisted wire construction of the invention is shown as it appears within sleeve 12. The trap 10 constructed according to the teachings of the present invention is formed of a high tension wire such as tempered steel wire. Other types of wire can be used in constructing trap 10, as is known in the art. The presently preferred construction of trap 10 is unitary, such that the trap 10 is formed of a single piece of wire, the wire having bends at 26, 28, 30, 32, 34, 36, 38, 40, 42, 44, 46 and 48, a total of twelve bends in the wire.

Beginning at end 24 of the wire, a bend at 26 forms a hook 50 upon trigger arm 52 for engaging the bait 18 thereon. Second and third bends 28 and 30 form and define latch receptacle 54. Latch receptacle 54 includes bends 28 and 30 and the portion of the wire therebetween. Trigger arm 52 includes hook 50, latch receptacle 54, and the portion of wire therebetween. Bend 32 is a downward and inward bend in base jaw 20, and bend 34 within base jaw 20 bring the wire of trap 10 into a broad V-shaped configuration. A U-notch 56 is formed at bend 36. Base spring 58 extends between bend 38 adjacent U-notch 56 and end bend 40 in the wire forming trap 10. Torsion spring 60 is twisted relative to base spring 58. Although the presently preferred embodiment of the invention is formed of a single piece of wire, it can be formed of more than one piece of wire as is known to those of skill in the art.

Torsion spring 60 extends between end bend 40 and bend 42 in the wire forming trap 10. Bend 42 joins torsion spring 60 and spring jaw 22. Spring jaw 22 is formed in a u-configuration between bend 42 and bend 46 of the wire. Spring jaw 22 is provided with an intermediate bend 44 which forms spring jaw 22 in a u-configuration.

Figure 2:
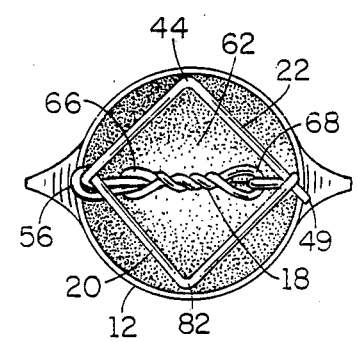
FIG. 2 is a top plan view of an apparatus constructed according to the teachings of the present invention.

Opening 62 is formed between spring jaw 22 and base jaw 20 when trap 10 is set with bait 18 and biased in a first open position shown in FIGS. 1–3. A final bend 48 in the wire forming trap 10 is provided in close proximity to end 49 of the wire. Bend 48 forms a latch 64 which is releasably set adjacent latch receptacle 54 when trap 10 is baited and set. The pasta bait 18 is slipped onto the torsion spring 60 and base spring 68 at an end 66 of the bait 18, and is slidably received at a second end 68 on the hook 50 upon trigger arm 52. Bait 18 can be held between trigger arm 52 and springs 58 and by string or other attachment means (not shown). Both base spring 58 and torsion spring 60 are spring biased apart from each other and both function as torsion springs.

The trap 10 is released by breaking of the bait 18, which would normally occur when the bait 18 is nibbled by the animal to be caught. To nibble on the bait 18, the animal must approach the bait through opening 62, placing the head and the body within the trap 10 and between the jaws 20 and 22 of the trap 10. Upon release of the trap 10 by breaking bait 18, the jaws 20 and 22 of the trap almost instantaneously are spring biased together and impelled closed by the now-released tension in the torsion spring 60, and, in an opposing direction, the now released tension in the base spring 58.

To use trap 10, trap 10 is baited with bait 18 which is set so as to exert forces on trigger arm 52 and base jaw 20. Those forces exerted on trigger arm 52 and base jaw 20 bend trigger arm 52 downwardly from latch receptacle 54 and bend base jaw 20 toward the interior of trap 10. With trap 10 biased in the first open position shown in FIGS. 1–3, the aforementioned downward and inward bending of trigger arm 52 and base jaw 20, respectively causes latch receptacle 54 to force and hold latch 64 closely adjacent bend 30.

When the forces exerted by bait 18 are eliminated by the breaking of bait 18, trigger arm 52 and base jaw 20 are able to slide upwardly and exteriorly from the interior of trap 10. Such sliding or trigger arm 52 and base jaw 20 releases latch 64 from engagement with trigger arm 52. Once latch 64 is so released, spring jaw 22 and base jaw 20 are able to close opening 62 since bends 44 and 32 are then able to move towards each other and since spring jaw 22 is pivotable within U-notch 56 of base jaw 20. Thus the jaws 20 and 22 of the trap 10 close instantly around the head or body of the intruding animal (not shown). It should be noted that the pasta bait 18 does not hold the force of the jaw 20, 22. Rather, the pasta bait 18 holds bend 30 of latch receptor 54 in close engagement with latch 64. Such close engagement, in turn, holds torque of base spring 58 opposite torque of torsion spring 60 through the points of engagement between latch receptacle 54 and latch 64.

The spring arm 22 pivots within U-notch 36 adjacent to the base jaw 20. When the trap 10 is in a set position, the spring arm 22 is both slidably and pivotally received within the U-notch 56 of the base jaw 20, and the latch 64 is slidably abutted adjacent latch receptacle 54.

As can be understood from the foregoing, a mouse or other animal will be caught humanely and quickly in the trap 10 as the spring jaw 22 and base jaw 20 close towards each other trap 10. The entire trap 10 within sleeve 12 can then be discarded if desired, and a user of trap 10 is not required to touch the entrapped animal at any time, or even to see the entrapped animal if the sleeve is extended (not shown) beyond the jaws 20 and 22 of the trap 10. As can be seen from the description of the invention, the trap can be re-set and re-baited if desired.

Referring to FIG. 2, a set trap 10 having bait 18 is shown from the mouse's eye view. A hungry mouse smells the pasta 18 within trap 10, and enters trap 10 between base jaw 20 and spring jaw 22 to investigate within the interior of sleeve 12. When the hungry mouse has gnawed on the pasta 18 sufficiently to break the pasta 18, the forward tension of base jaw 20 is released, permitting base jaw 20 to slide forward so that latch 64 is disengaged from latch receptacle 54, and base jaw 20 and spring jaw 22 close around the animal. The animal is caught within trap 10, and held between base jaw 20 and spring jaw 22 as it dies quickly from asphyxiation or a severed spinal cord.

Although the invention has been described in conjunction with the foregoing specific embodiment, many alternatives, variations and modifications are apparent to those of ordinary skill in the art. Those alternatives, variations and modifications are intended to fall within the spirit and scope of the following claims.

What is claimed is:

1. An animal trap comprising:
   first and second arms;
   edible means for holding said first and second arms in a first open position;
   biasing means for biasing said first and second arms toward a second closed position; and
   engaging means formed in each of said first and second arms for engaging a portion of the body of an animal after the animal breaks said edible means, said engaging means further comprising a base jaw and a spring jaw, a first end of said base jaw and a first end of said spring jaw being integral with said biasing means, said spring jaw further comprising a latch formed at a second end thereof.

2. The apparatus of claim 1 wherein said base jaw additionally comprises a trigger arm formed at a second end thereof.

3. The apparatus of claim 2 wherein said latch is releasably engaged adjacent said trigger arm.

4. The apparatus of claim 3 wherein breaking said edible means for holding said first and second arms in a first open position slidably releases said trigger arm and said latch from the releasable abutment of said latch adjacent said trigger arm.

5. An animal trap comprising:
a base spring member;
a torsion spring member, said torsion spring member twisted relative to said base spring member and integral therewith;
a base jaw integral at a first end with said base spring member;
a trigger arm formed at a second end of said base jaw;
a U-notch formed at a first end of said base jaw;
a spring jaw integral at a first end with said torsion spring member;
a latch formed at a second end of said spring jaw; and
an edible trigger means slidably received upon said trigger arm at a first end of said edible trigger means and upon said base spring member and said torsion spring member at a second end of said edible trigger means, and extending therebetween for holding said spring jaw biased apart from said jaw in a first open position.

6. The apparatus of claim 5 wherein said edible trigger means comprises dried pasta.

7. The apparatus of claim 6 wherein said base spring member and said torsion spring member, said base jaw, said spring jaw, said trigger arm, said U-notch and said latch are formed from one continuous piece of wire.

8. The apparatus of claim 5 additionally comprising a funnel-shaped sheath, said sheath being closed at a first end and open at a second end.

9. The apparatus of claim 5 wherein said base jaw and said spring jaw are positioned in a second open position, wherein said latch engages said trigger arm and a bait is releasably secured between said trigger arm and said base spring member and said torsion spring member, and said base jaw and said spring jaw are tension-biased apart from each other said first jaw arm pivotally received with in said U-notch.

10. The apparatus of claim 5 wherein said base jaw and said spring jaw are positioned in a second closed position when the edible trigger means is broken by an animal, said jaws engaging a portion of the body of the animal.

11. An animal trap comprising:
first and second arms;
edible means for holding said first and second arms in a first open position;
biasing means for biasing said first and second arms toward a second closed position, said biasing means comprising a torsion spring member of said first arm and a base spring member of said second arm, said torsion spring member pivotally received at a first end within a U-notch formed at a first end of said base spring member, said torsion spring member and said base spring member integral at second ends thereof, and said torsion spring member being twisted relative to said base spring member; and
means formed in each of said first and second arms for engaging a portion of the body of an animal after the animal breaks said edible means, thereby allowing said first and second arms to spring towards said closed position to engage the body of the animal.

* * * * *